US009720419B2

(12) United States Patent
O'Neill et al.

(10) Patent No.: US 9,720,419 B2
(45) Date of Patent: Aug. 1, 2017

(54) SYSTEM AND METHOD FOR REMOTE CONTROL OF UNMANNED VEHICLES

(71) Applicants: Trevor O'Neill, Lawrenceville, NJ (US); Samuel Reeves, Philadelphia, PA (US); Joshua Koplin, Philadelphia, PA (US); Anthony Calabro, Philadelphia, PA (US); Nathan Bivans, Cinnaminson, NJ (US); Erik de Brun, Philadelphia, PA (US); Scott Poff, Philadelphia, PA (US); Richard Derman, Langhorne, PA (US)

(72) Inventors: Trevor O'Neill, Lawrenceville, NJ (US); Samuel Reeves, Philadelphia, PA (US); Joshua Koplin, Philadelphia, PA (US); Anthony Calabro, Philadelphia, PA (US); Nathan Bivans, Cinnaminson, NJ (US); Erik de Brun, Philadelphia, PA (US); Scott Poff, Philadelphia, PA (US); Richard Derman, Langhorne, PA (US)

(73) Assignee: Humanistic Robotics, Inc., Philadelphia, PA (US)

( * ) Notice: Subject to any disclaimer, the term of this patent is extended or adjusted under 35 U.S.C. 154(b) by 86 days.

(21) Appl. No.: 14/846,866

(22) Filed: Sep. 7, 2015

(65) Prior Publication Data
US 2016/0011596 A1  Jan. 14, 2016

Related U.S. Application Data

(63) Continuation of application No. 14/044,136, filed on Oct. 2, 2013, now Pat. No. 9,156,476.

(51) Int. Cl.
*G05D 1/02* (2006.01)
*B60W 50/029* (2012.01)
(Continued)

(52) U.S. Cl.
CPC .......... *G05D 1/0276* (2013.01); *B25J 13/006* (2013.01); *B60W 30/18* (2013.01);
(Continued)

(58) Field of Classification Search
CPC ........ H02P 6/00; B60L 11/1803; B60L 15/40; G05D 3/00; G05D 1/00; G05D 1/0276;
(Continued)

(56) References Cited

U.S. PATENT DOCUMENTS 6,109,568 A * 8/2000 Gilbert .................. B61L 23/005
104/88.03
8,977,414 B2 * 3/2015 Yamada .................. B60L 15/40
701/20

(Continued)

*Primary Examiner* — Behrang Badii
(74) *Attorney, Agent, or Firm* — Michael W. Tieff

(57) ABSTRACT

An open architecture control system is provided that may be used for remote and semi-autonomous operation of commercial off the shelf (COTS) and custom robotic systems, platforms, and vehicles to enable safer neutralization of explosive hazards and other services. In order to effectively deal with rapidly evolving threats and highly variable operational environments, the control system is built using an open architecture and includes a high level of interoperability. The control system interfaces with a large range of robotic systems and vehicles, autonomy software packages, perception systems, and manipulation peripherals to enable prosecution of complex missions effectively. Because the control system is open and does not constrain the end user to a single robotics system, mobile platform, or peripheral hardware and software, the control system may be used to assist with a multitude of missions beyond explosive hazard detection and clearance.

20 Claims, 9 Drawing Sheets

(51) Int. Cl.
- *B60W 30/18* (2012.01)
- *B60W 50/00* (2006.01)
- *B25J 13/00* (2006.01)
- *F41H 11/16* (2011.01)
- *G05B 19/048* (2006.01)
- *B61L 23/00* (2006.01)
- *G05D 1/00* (2006.01)
- *B61L 3/00* (2006.01)
- *B61L 23/34* (2006.01)
- *G05D 3/00* (2006.01)
- *B60L 15/40* (2006.01)
- *B60L 11/18* (2006.01)
- *H02P 6/00* (2016.01)

(52) U.S. Cl.
CPC .......... *B60W 50/00* (2013.01); *B60W 50/029* (2013.01); *F41H 11/16* (2013.01); *G05B 19/048* (2013.01); *G05D 1/0022* (2013.01); *G05D 1/0038* (2013.01); *G05D 1/0077* (2013.01); *G05D 1/0088* (2013.01); *B60L 11/1803* (2013.01); *B60L 15/40* (2013.01); *B60W 2050/0292* (2013.01); *B61L 3/00* (2013.01); *B61L 23/00* (2013.01); *B61L 23/005* (2013.01); *B61L 23/34* (2013.01); *G05B 2219/23471* (2013.01); *G05D 1/00* (2013.01); *G05D 3/00* (2013.01); *G05D 2201/0202* (2013.01); *H02P 6/00* (2013.01); *Y10S 901/01* (2013.01)

(58) Field of Classification Search
CPC .. B61L 23/34; B61L 3/00; B61L 23/00; B61L 23/005; B60W 50/029; B60W 30/18; B60W 50/00; B60W 2050/0292
See application file for complete search history.

(56) References Cited

U.S. PATENT DOCUMENTS

| | | | |
|---|---|---|---|
| 2014/0055077 A1* | 2/2014 | Barrass | B60L 11/1803 318/700 |
| 2014/0214248 A1* | 7/2014 | Yamada | B60L 15/40 701/20 |

* cited by examiner

800

SYSTEM AND METHOD FOR REMOTE CONTROL OF UNMANNED VEHICLES

CROSS-REFERENCE TO RELATED APPLICATIONS

This application claims priority to U.S. Provisional Patent Application No. 61/709,091. This application is a continuation of U.S. patent application Ser. No. 14/044,136. The contents of both applications are hereby incorporated by reference in their entirety.

BACKGROUND

The use of autonomous or unmanned vehicles is growing. Unmanned vehicles may be suitable for a variety of industries including construction, manufacturing, and military. While there are many advantages associated with the use of autonomous vehicles, there are also several issues.

On such issue is safety. For example, how do we ensure that unmanned vehicles can be stopped should they become unresponsive due to a software malfunction, or when a remote operator becomes incapacitated or otherwise loses control of the vehicle? Another issue is interoperability. Currently there exist many proprietary systems for unmanned vehicles, making it difficult to design systems or applications that will work across a variety of vehicle systems and types.

SUMMARY

An open architecture control system is provided that may be used for remote and semi-autonomous operation of commercial off the shelf (COTS) and custom robotic systems, platforms, and vehicles to enable safer neutralization of explosive hazards and other services. In order to effectively deal with rapidly evolving threats and highly variable operational environments, the control system is built using an open architecture and includes a high level of interoperability. The control system interfaces with a large range of robotic systems and vehicles, autonomy software packages, perception systems, and manipulation peripherals to enable prosecution of complex missions effectively. Because the control system is open and does not constrain the end user to a single robotics system, mobile platform, or peripheral hardware and software, the control system may be used to assist with a multitude of missions beyond explosive hazard detection and clearance.

In an implementation, a method may include: receiving a current location of an operator at an instrument control system of an unmanned vehicle; determining a leading distance of the unmanned vehicle by the instrument control system; determining a current location of the unmanned vehicle by the instrument control system; determining if a difference between the current location of the operator and the current location of the unmanned vehicle is less than the leading distance; and if so, increasing the speed of the unmanned vehicle by the instrument control system.

In some implementations, the method may further include: determining if a difference between the current location of the operator and the current location of the unmanned vehicle is greater than the leading distance; and if so, decreasing the speed of the unmanned vehicle by the instrument control system. The method may further include that the current location of the operator is received from a hand held controller, and that the leading distance is randomly generated.

In an implementation, a system for halting the operation of machinery may include: at least one e-stop controller comprising a first radio; and at least one e-stop comprising: a second radio; a software based failsafe; and a hardware based failsafe, wherein the hardware based failsafe is adapted to: monitor a wireless connection between the first radio and the second radio; determine if the wireless connection has been severed; and if so, halt machinery associated with the e-stop; and wherein the software based failsafe is adapted to: receive a first signal from the e-stop controller via the second radio; and determine whether to halt the machinery associated with the e-stop based on received first signal.

In some implementations, the system may further include that the first signal is a heartbeat signal, and the software based failsafe may determine not to halt the machinery associated with the e-stop based on the heartbeat signal. The first signal may be a stop signal, and the software based failsafe may determine to halt the machinery associated with the e-stop based on the stop signal. The system may further include that the e-stop controller is further adapted to: determine whether to halt the machinery associated with the e-stop; and if so, sever the wireless connection between the first radio and the second radio. Severing the wireless connection may include turning off the first radio. Determining whether to halt the machinery associated with the e-stop may include determining that a second signal has not been received from the e-stop for more than a threshold amount of time. The second signal may be a heartbeat signal.

In some implementations, the system may further include a plurality of e-stops and e-stop controllers, wherein the plurality of e-stops and e-stop controllers form a mesh network. The e-stop controller may be automatically associated with the e-stop based on a distance between the e-stop and the e-stop controller. The e-stop may include a first location determiner and the e-stop controller may include a second location determiner, and further wherein: the e-stop is adapted to determine a first location of the e-stop using the first location determiner and send the determined first location to the e-stop controller; and the e-stop controller is adapted to determine a second location of the e-stop controller using the second location determiner, determine if a distance between the first and second locations exceeds a threshold, and if so, determine to halt the machinery associated with the e-stop. Determining to halt the machinery associated with the e-stop may include one of sending a stop signal to the e-stop and turning off the first radio. The machinery may be an unmanned vehicle.

In an implementation, a system for controlling unmanned vehicles may include: a vehicle integrated control system that is non-destructively integrated into the unmanned vehicle; and an operation control unit that generates one or more instructions and provides the generated one or more instructions to the vehicle integrated control unit, wherein the vehicle integrated control unit is adapted to receive the generated one or more instructions, and in response to the generated one or more instructions, control the operation of the unmanned vehicle, and further wherein the operation control unit is adapted to receive one or more of sensor data and location data from the vehicle integrated control unit, and to make the one or more of sensor data and location data available to one or more devices over a network.

In an implementation, the system may further include that the devices are one or more of smart phones, laptops, or tablets. The operation control unit may include a Hand Held Controller and a Remote Viewing Sensor.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
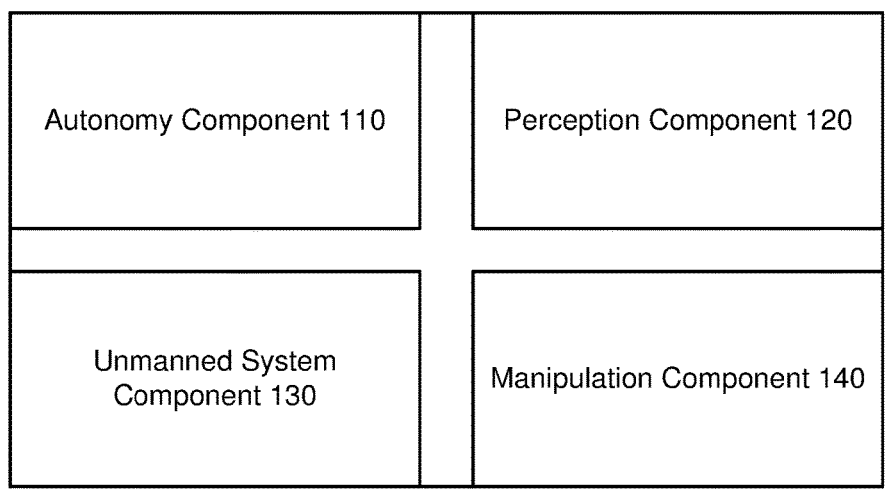
FIG. 1 is a high level illustration of the OIP.

FIG. 1 is a high level illustration of the Open Integration Platform (OIP) 100. The OIP 100 is a control system for unmanned vehicles that translates user commands into manipulations or movements of the unmanned vehicle and provides for failsafe integration of third-party software, sensors, and actuation peripherals through an application programming interface (API). The OIP 100 may be configured to communicate with many robotic systems and vehicle command protocols and is portable across platforms in alternate operational scenarios.

The OIP 100 may be designed to allow for easy integration with respect to one or more components through the API. Examples of such components are illustrated in FIG. 1, and include autonomy software component 110, perception component 120, unmanned system component 130, and manipulation components 140. Other components may be supported.

As will be described further below, the OIP 100 may further include one or more built-in or base features. One example of such a feature is the ability to interface and control a variety of vehicles. The OIP 100 may support a variety of vehicle control interfaces including Drive-by-wire, for example. Other vehicle control interfaces may be supported. The vehicle control commands and protocols used for a variety of vehicle types may be abstracted by the API into a single vehicle control library of functions, allowing users and programmers to create a single custom software component that may be used to control a variety of vehicle types using the API. The OIP 100 may similarly provide a single library of functions that may be used to control and interact with a variety of sensors and peripheral devices.

Another example of an integrated feature is safety features. The safety features may be integrated into the OIP and kept separate from the other components of the OIP such that one or more of the autonomy software components 110, unmanned system components 130, perception components 120, and manipulation components 140 can be changed by users without compromising the safety of the system as a whole. Further, such built in safety features allow users to create their own components for the OIP 100 using the API without having to consider how to implement safety features, or worrying about interfering with existing safety features.

Any unmanned system developed using the OIP 100 as the integration hub may achieve the following advantages when compared with existing systems:

Flexibility: The flexible API provided by the OIP 100 allows for a wide variety of components to be easily added or removed from any unmanned system that uses the OIP 100. For example, users may add or remove components from the unmanned system as threats, mission needs, technologies, or budgets change. The open system of the OIP 100 ensures that the user can use a range of sensors and/or software components from a wide range of providers in their unmanned system, not just those provided by the original manufacturer of the unmanned system.

Safety: By separating the safety features from the computation engine, any unmanned system built using the OIP 100 is assured a high level of safety. Furthermore, an open system built on OIP 100 may allow the components to be changed or modified without affecting the safety features of the system.

Speed: Any unmanned vehicle built using the OIP 100 includes locked down protocols for low-level critical commands and safety supervision. Because these crucial elements of the system remain unchanged, all other elements of the system can be changed much faster than if the core elements had to be redesigned and integrated.

Cost: Any customer or partner using the OIP 100 may be able to avoid substantial development costs for the base hardware and software that enables unmanned system integration. By relying on the OIP 100 for this core, a user would benefit from significant development and testing already completed for the OIP 100.

Innovation: Threats, tasks, technologies, and budgets change all the time in the world of unmanned systems, and increased innovation is required to confront such complexity. By utilizing an open system the OIP 100, the user, customer, partner, and stakeholders can rely on a wealth of easily integrated existing technology to help solve problems and reduce complexity much faster, cheaper, and with higher quality than with closed systems.

Figure 2:
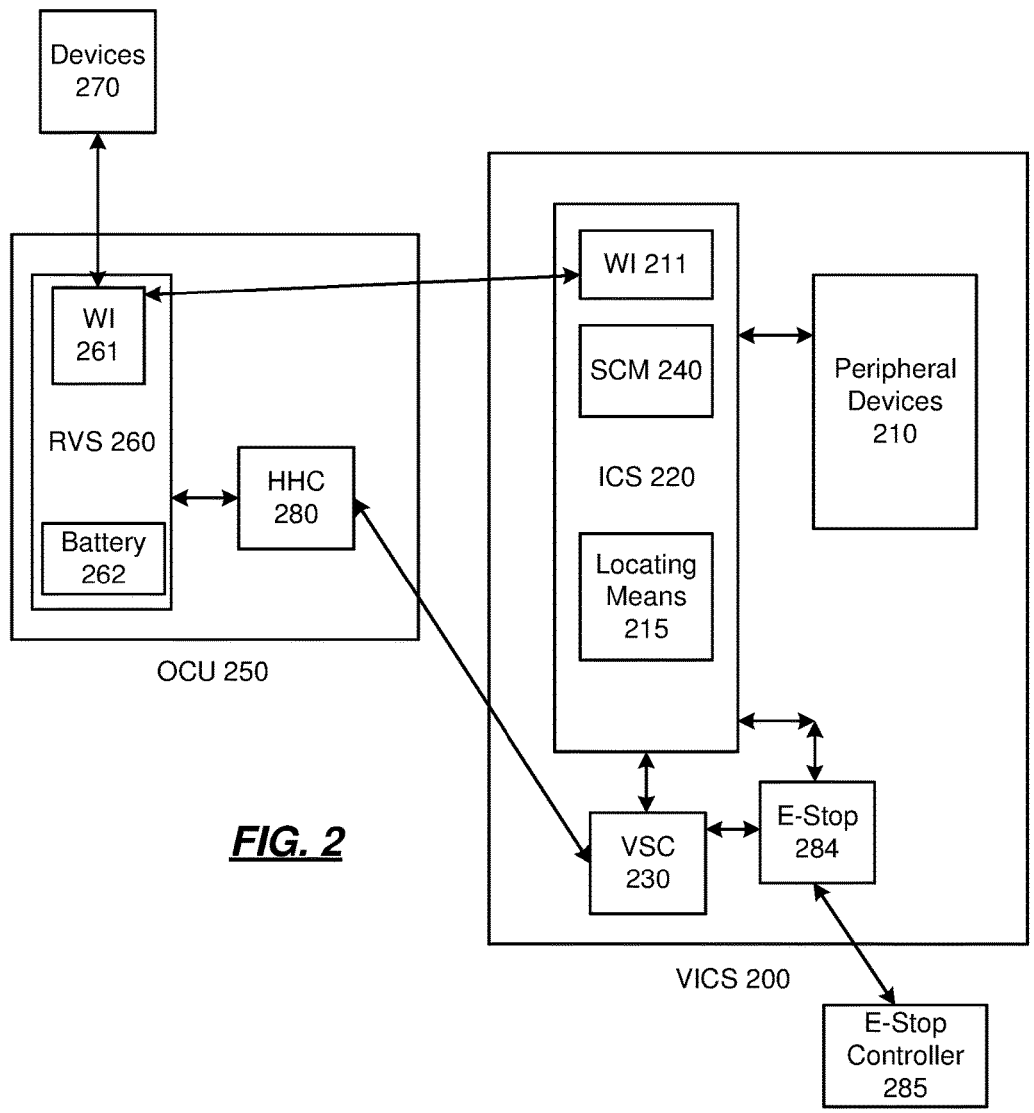
FIG. 2 is a more detailed illustration of the OIP.

FIG. 2 is a more detailed illustration of the OIP 100. In the example shown, the OIP 100 is broken down into two major subsystems: the Vehicle Integrated Control System (VICS) 200 and the Operator Control Unit (OCU) 250. The VICS 200 may provide a non-destructive means through which one or more users may control a vehicle, may receive information about the vehicle, or may receive information from or control the operation of one or more peripheral devices 210 associated with the vehicle. The VICS 200 is non-destructive in that the vehicle may be operable by an in-vehicle driver even when the VICS 200 is attached or otherwise integrated into the vehicle, and when the VICS 200 is removed the functions of the vehicle are not impaired.

The OCU 250, on the other hand, may provide one or more customizable user interfaces through which one or more users may control the vehicle through the VICS 200.

The user interfaces may also be used to view data provided by the VICS 200, or from the peripheral devices 210 associated with the VICS 200. Other components and/or subsystems may be supported. The peripheral device devices 210 may include, but are not limited to, cameras, lights, weapons and other sensors.

Together, the OCU 250 and the VICS 200 may be used to provide control over an unmanned vehicle, and may allow one or more operators of the unmanned vehicle to view and share data provided by one or more of the peripheral devices 210, or from the vehicle itself.

In some implementations, the VICS 200 may include a Vehicle Systems Controller (VSC) 230. The VSC 230 may be adapted to non-destructably interface with a variety of vehicles using a variety of interfaces and/or control systems such as Drive-by-wire (J1939), Direct-drive electric motors (typically found in small robots), and Hydraulic or mechanical controls. Other systems or interfaces may be supported. The VSC 230 may receive a variety of diagnostic and status information from the vehicle including, but not limited to speed, temperature, oil pressure, fuel level, tire pressure, or any other information supplied by a vehicle in its normal operational state. The VSC 230 may also include one or more integrated sensors such as an accelerometer, a GPS or other location detection means, a magnetometer, a thermometer, and a barometer, for example. Other sensors may also be supported. The VCS 230 may be implemented using a general purpose computing device such as the computing system 900 described with respect to FIG. 9. An exemplary VCS 230 is described further with respect to FIG. 4.

The VSC 230 may provide such information to one or more users associated with the OCU 250 through a wireless communication means that may be integrated into the VSC (i.e., Bluetooth, Wi-Fi, etc.). Alternatively, or additionally, the VSC may provide such information to one or more smart phones, tablets, or any other devices that are able to receive data via a wireless interface.

For example, an owner of a fleet of construction vehicles may use the OCU 250, or a smart phone associated with the owner, to query a VSC 230 connected to each of the vehicles in the fleet. Each VSC 230 may receive the query and may provide the status information associated with its associated vehicle to the OCU 250. The owner may then use the status information assisted with each vehicle to determine which vehicles may require servicing.

The VSC 230 may also control the operation of the vehicle through the one or more interfaces. For example, the VSC 230 may control the throttle, brakes, transmission, lights locks, or any other systems of a vehicle that may be controlled electronically through an interface. In some implementations, the VSC 230 may control the operation of the vehicle based on one or more signals received directly from the OCU 250. In other implementations, the VSC 230 may control the operation of the vehicle based on one or more signals received directly from an Instrument Control System (ICS) 220 of the VICS 200.

In some implementations, the ICS 220 may include electrical and computer networking components and may interface with, and provide power to, a variety of components including lights, sensors, and cameras (i.e., the peripheral devices 210). The supported computer networking components may include Ethernet (powered or unpowered), USB, Bluetooth, eSATA, or any other type of networking or connecting means. The ICS 220 may receive power from a vehicle that the ICS 220 is mounted to, or may include its own power source such as a battery or one or more solar panels. In implementations where the ICS 220 receives power from the vehicle, the ICS 220 may include a fuse or other means to limit the amount of current that is drawn from the vehicle. The ICS 220 may be attached to a vehicle through a roof mount. Other vehicle locations or attachment means may be supported.

The ICS 220 may further include a locating means 215. The locating means 215 may determine the location of the ICS 200, and therefore the location of the vehicle that the ICS 220 is attached to. Any one of a variety of technologies for determining locations such as GPS, and cellular triangulation may be used.

The ICS 220 may a wireless interface 211. The wireless interface 211 may include one or more radios and may be capable of receiving one or more control signals from the OCU 250. The ICS 220 may further be capable of transmitting data from one or more of the peripheral devices 210 that are connected to the ICS through the one or more radios of the wireless interface 211. The transmitted data may include output from the VSC 230 (e.g., information from and about the vehicle including speed, oil pressure, and other diagnostic information), signals from one or more of the peripheral devices 210 connected to the ICS 220 (e.g., video, audio, temperature, and other sensor data), and location information determined by the locating means 215. In some implementations, both the control signals from the OCU 250 and the data signals from the ICS 220 may be received and provided by the same radio and/or frequencies of the wireless interface 211. Alternatively, different radios and/or frequencies may be used for control signals and data signals. The ICS 220 may be implemented by a general purpose computing device such as the computing system 900 described with respect to FIG. 9.

The ICS 220 may further include one or more emergency stops (e-stops) 284. When the ICS 220 receives a signal from the e-stop 284, the ICS 220 may immediately disable the vehicle by sending the appropriate signal(s) to the VSC 230. For example, in one implementation, the e-stop 284 may be highly visible button that is located inside and/or outside the vehicle. When the button is pushed, the ICS 220 may signal the VSC 230 to immediately stop the vehicle by applying the brakes and/or disengaging the throttle, for example. The particular steps or actions that occur upon engaging an e-stop 284 may be set by a user or administrator. The e-stops 284 may be both wired and wireless. In addition, in some implementations, the e-stop 284 signal may also be received directly by the VSC 230 providing additional safety protection and isolation from the various components of the ICS 220. The e-stops 284 may be integrated into the OIP 100, may be integrated into a third-party control and automation system, or may function as a stand-alone system as will be described further bellow.

In some implementations, each e-stop 284 may be wirelessly controlled by one or more e-stop controllers 285. When a user or operator of the e-stop controller 285 determines that the vehicle (or other stationary and non-stationary machinery such as factory equipment or farm equipment) should be stopped, the user may use the e-stop controller 285 to send a stop signal to the e-stop 284 corresponding to the vehicle. The e-stop 284 may then receive the stop signal, and may instruct the ICS 220 and/or VSC 230 to deactivate the vehicle.

In some implementations, each e-stop 284 associated with a vehicle or VICS 200 may have its own associated e-stop controller 285. Alternatively, one e-stop controller 285 may be associated with a variety of e-stops 284 within a selected range of the e-stop controller 285, or are otherwise paired with the e-stop controller 285. For example, a fleet of unmanned vehicles may be used on a construction site. Each vehicle may have a VICS 200 with an associated e-stop 284. One or more foremen associated with the construction site may receive an e-stop controller 285 (a wireless dongle, for example) that is associated with or paired with the e-stops 284 of all the vehicles used on the construction site. If a foreman believes that an accident has occurred or that the safety of a worker is being compromised, the foreman may activate the e-stop controller 285 which will cause each associated e-stop 284 to disengage its associated vehicle.

In another implementation, a user associated with an e-stop controller 285 may select the particular e-stop 284 that it would like to send a stop signal to. For example, the e-stop controller 285 may have a display that includes a list of the e-stops 284 and/or the vehicles or machinery associated with each e-stop 284. A supervisor could use the display of the e-stop controller 285 to choose a specific vehicle or machinery that is behaving in an unsafe manner or may be malfunctioning, and may activate the e-stop 284 associated with that vehicle or machinery only. Such remote e-stop controller 285 functionality could be distributed to multiple individuals with safety responsibility, forming a distributed network of e-stops 284 and e-stop controllers 285. Any individual in this network could choose any machine within the network that they would like to stop using the e-stop controller 285, and activate the e-stop 285 for that vehicle specifically to disengage it. Both the e-stop 284 and e-stop controller 285 may be implemented using a general purpose computing device such as the computing system 900 illustrated with respect to FIG. 9.

Additional safety features may be integrated into the VSC 230. For example, in some implementations, the VSC 230 may receive what is referred to as heartbeat signal from the ICS 220 that indicates that the IC 220 is receiving signals from OCU 250. If the heartbeat signal is not received by the VSC 230 from the ICS 220, the VSC 230 may immediately shut down or disengage the vehicle, or alternatively may gradually slow the vehicle. By providing the safety functionality within the VSC 230 rather than the ICS 220, the safety of the vehicle is not compromised by the particular sensors or peripheral devices 210 that are connected to the ICS. 220

The ICS 220 may further include a Shared Control Module (SCM) 240. The SCM 240 may be a computing device (such as the computing system 900) and may provide the API functionality described herein. The ICS 220 may allow one or more customized control modules to interface with the ICS 220 and the one or more peripheral devices 210 that are connected to the ICS 220 including the VSC 230. Thus, for example, a user may interact with the sensors connected to the ICS 220 using the API provided by the SCM 240. The SCM 240 may then translate the various function calls of the API into the particular format or protocols expected by each peripheral device 210. Similarly, a user may create an application that controls the vehicle using the API without knowing the particular functions or protocols used by the vehicle. The SCM 240 may then translate the function calls of the API according to various functions and/or protocols that are expected by the vehicle. Thus, the SCM 240 provides a layer of abstraction of the vehicle and peripheral device 210 interfaces that allows a single application to work with a wide variety of vehicle and peripheral device types.

Figure 5:
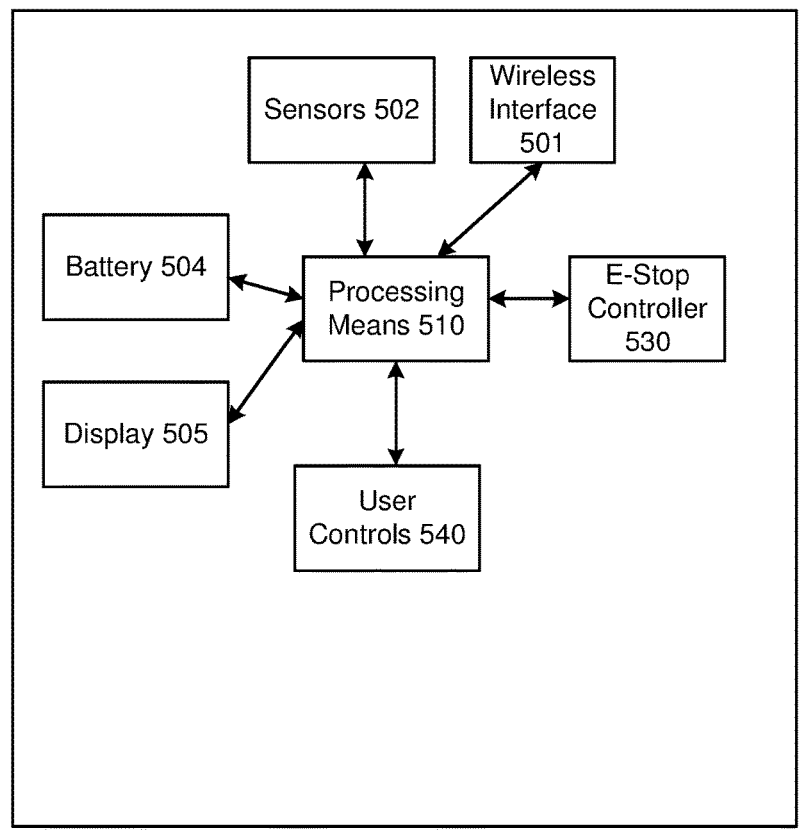
FIG. 5 is an illustration of an example HHC.

The OCU 250 may include a hand held controller (HHC) 280. The HHC 280 may be a controller that provides control data or instructions to the ICS 220 and/or directly the VSC 230. In some implementations, the HHC 280 may include one or more analogue control sticks and/or buttons that may be used to control the steering, braking, throttle, and other functionality of the vehicle. The HHC 280 may further control other operations of the vehicle including locks, lights, and horn, for example. In some implementations, the HHC 280 may also control the operation of one or more sensors or other peripheral devices 210 of the ICS 220. The HHC may include a GPS, or other location determination means, and may provide the location of the HHC along with any control data to the ICS/VSC. The HHC 280 may be ergonomic, waterproof, and rugged. An example schematic of the HHC is illustrated in FIG. 5. Note that all wireless communication described herein between the OCU 250 and the VICS 200 may be encrypted or otherwise protected.

In addition to the HHC 280, in some implementations, the OCU 250 may further include one or more Remote Viewing Stations (RVS) 260. The RVS 260 may be a rugged portable system allowing one or more users to monitor the ICS 220 and/or VCS 230 remotely. The RVS 260 may include a power source such as a battery 262, and may allow for the charging one or more devices 270 including the HHC 280. The RVS 260 is intended to be easily carried by an operator, or may be stored in a vehicle (including the unmanned vehicle) until needed. The RVS 260 may be implemented using a general purpose computing device such as the computing system 900 illustrated with respect to FIG. 9.

The RVS 260 may further include a wireless interface 261. The wireless interface 261 may include one or more radios and/or antennas, and may be used to receive data (such as location information, speed, etc.) from the ICS 220 and/or VSC 230 and may make the received data available to one or more devices 270 such as smart phones, tablets, laptops, etc. In some implementations, the RVS 260 may use the wireless interface 261 to create a protected Wi-Fi network that operators may connect to in order to view sensor data on their devices 270. In some implementations, the operators may use their personal devices to control the vehicle, or to control the operation of one or more sensors or peripheral devices 210 of the ICS 220 and/or VSC 230. The RVS 260 may pass on any commands or instructions received by the RVS 260 to the ICS 220 or VSC 230 depending on the implementation.

The RVS 260 may further include one or more safety features. For example, the RVS may include an e-stop controller 285.

Figure 3:
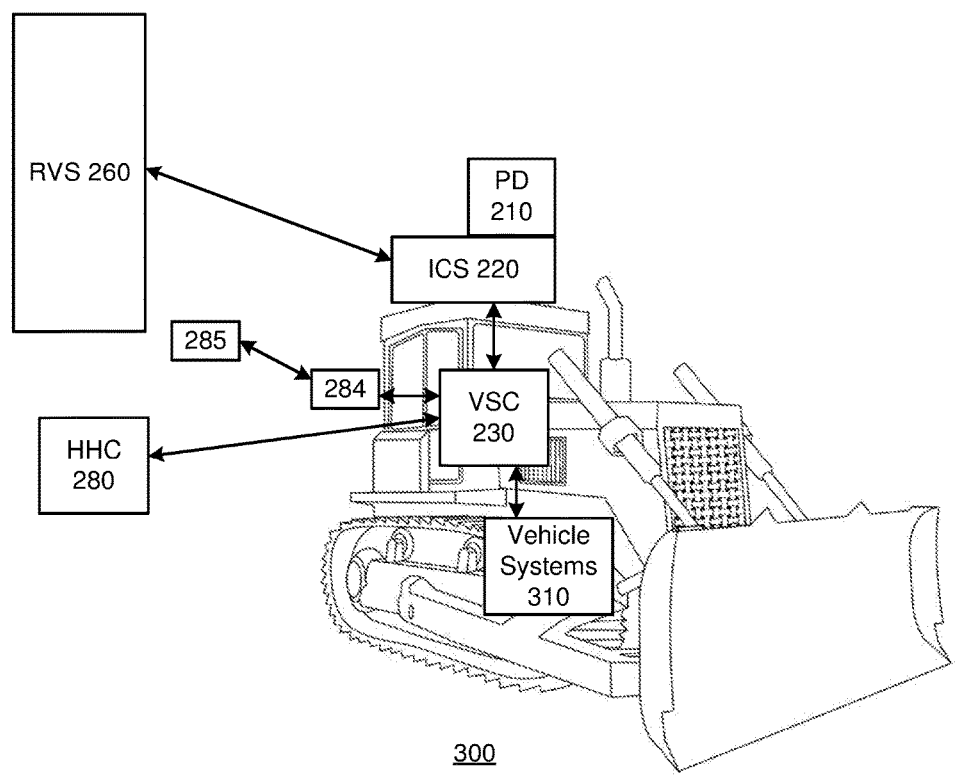
FIG. 3 is an illustration of a vehicle control scenario using the OIP.

FIG. 3 is an illustration of an example scenario where an OCU 250 is used to control a vehicle 300 through a VICS 200. In the example shown, the vehicle 300 is a bulldozer. However, a variety of vehicles may be supported.

The vehicle 300 includes a vehicle system 310 that is connected to the VCS 230 of the VICS 2000. The vehicle system 310 may be a drive by wire system, and may include an interface such as a 50 pin signal connector through which the VCS 230 may provide commands to the vehicle 300, and may receive information from the vehicle such as speed, oil pressure, fuel level, engine temperature, etc. The VCS 230 may provide commands to the vehicle systems 310 to activate various controls associated with the vehicle 300 including lights, throttle, and brakes, for example.

The VCS 230 may receive operating instructions from the HHC 280, and may provide the instructions to the vehicle systems 310. Alternatively, or additionally, the VCS 230 may receive instructions from one or more devices associated with the RVS 260. For example, an operator of the HHC 280, may use a stick or control pad associated with the HHC 280 to cause the vehicle 300 to turn left. The HHC 280 may then provide a corresponding command wirelessly to the VCS 230. The VCS 230 may generate a command that may cause the vehicle system 310 to turn left, and may provide it to the vehicle systems 310. The vehicle 300 may then turn left.

The VSC 230 may provide the status information from the vehicle systems 310 to the ICS 220. As shown the ICS 220 may be attached to the roof or exterior of the vehicle to maximize the wireless range of the ICS 220. The ICS 220 may then provide the status information to the RVS 260 where the status information may be displayed or made available by the RVS 260.

In addition, the ICS 220 may determine a location of the vehicle 300, and may receive data from one or more peripheral devices 210 attached to the ICS 200, such as a camera. The location, peripheral device 210 data, and VCS 230 data may be provided to the RVS 260 where the data may be viewed by an operator of the RVS 260 and/or one or more devices 270.

For example, the RVS 260 may receive the current speed and location of the vehicle 300 from the VSC 230, along with video from a video camera peripheral device 210 mounted on the top of the vehicle 300. An operator of the RVS 260 may view a map that indicates the location of the vehicle 300, along with the video received from the peripheral device 210. In addition, the locations of other vehicles 300 may also be displayed on the map, and the operator may use the RVS 260 (or other connected device 270) to select the vehicle 300 whose video data the operator desires to view.

The VICS 200 also includes an e-stop 284. The e-stop 284 may be placed on the outside of the vehicle 300 so that an operator may manually activate the button or switch associated with the e-stop to halt the vehicle 300. When activated the e-stop 284 may send a signal to one or both of the ICS 220 and VSC 230 to cause the vehicle 300 to be immediately stopped.

In addition, the OCU 250 includes a corresponding e-stop controller 285 that can be used to halt the vehicle 300. The e-stop controller 285 may be a standalone device or may be integrated into some of all of the HHC 280 and the RVS 260. An operator may activate the e-stop controller 285 and the controller 285 may provide a stop signal that is received directly by the e-stop 284 or indirectly by either the VCS 230 or the ICS 220. In response to receiving the stop signal the vehicle 300 may halt as if the corresponding switch on the e-stop 284 had been activated.

Depending on the implementation, e-stop controller 285 and the e-stop 284 may include additional safety and/or failsafe features. For example, the e-stop 284 may monitor the state of the wireless connection between them. Should the e-stop 284 detect that the connection has been severed; the e-stop 284 may immediately halt the operation of the vehicle 300 as if the e-stop controller 285 had issued a stop command. Should the wireless connection be restored, the e-stop 284 may reactivate the vehicle 300. The wireless connection based failsafe may be implemented in hardware, for example As another level of failsafe, the e-stop 284 may periodically receive a heartbeat signal from the e-stop controller 285. Should the e-stop 284 not receive the heart beat signal from the e-stop controller 285 within a defined time interval, the e-stop 284 may deactivate the vehicle 300.

In addition, the e-stop 284 may also send a heartbeat signal to the e-stop controller 285. Should the e-stop controller 285 not receive the signal, the controller 285 may send a stop signal, and then may deactivate the wireless connection between the e-stop controller 285 and the e-stop 284. Should the e-stop 284 not receive or understand the stop signal because of a software malfunction, the hardware implemented failsafe will cause the e-stop 284 to deactivate the vehicle 300. Alternatively, the e-stop controller 285 may deactivate the wireless connection without sending the stop signal, which will similarly result in the e-stop 284 deactivating the vehicle 300.

Figure 4:
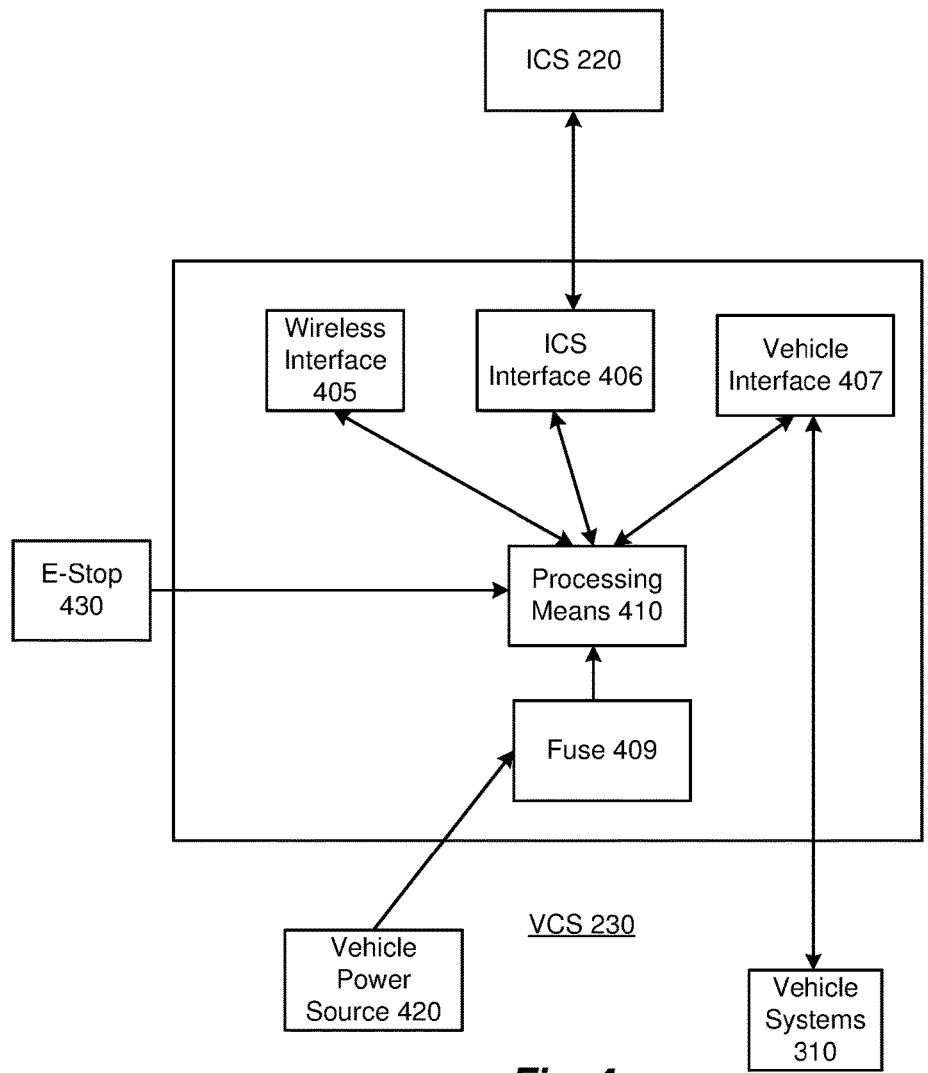
FIG. 4 is an illustration of an example VSC.

FIG. 4 is an illustration of an example VCS 230. As shown, the VCS 230 includes several components including a processing means 410, wireless interface 405, an ICS interface 406, a vehicle interface 407, and a fuse 409. More or fewer components may be supported.

The vehicle interface 407 may allow the VCS 230 to send data to, and receive data from, the vehicle systems 310. The data that the VCS 230 sends to the vehicle systems 310 may be control data such as instructions to apply brakes, increase or decrease speed, steering instructions, and instructions to turn on one or more lights. The received data may include status data such as information about an amount of remaining fuel and other diagnostic information about the vehicle. In some implementations, the vehicle interface 407 may be a 50 pin connector. However, other types of wired or wireless interfaces may be used.

The ICS interface 406 may allow the VCS 230 to send data to, and receive data from, the ICS 220. As described previously, in some implementations, the ICS 220 may be externally mounted to the vehicle and may include one or more peripheral devices 210 such as cameras or other sensors. In addition, the ICS 220 may receive control commands or instructions from one or more of the HHC 280 or the RVS 260, and may also provide information to the RVS 260 and/or HHC 280 regarding the status of the associated vehicle and data from the peripheral devices 210. Accordingly, the ICS interface 220 may allow the ICS 220 to pass any received control commands to the VCS 230, as well as the VCS 230 to provide any requested status information received from the vehicle systems 310 to the ICS 200. In some implementations, the ICS 406 may be a 24 pin signal connector. However, other types of wired or wireless interfaces may be used.

The wireless interface 405 may receive and/or transmit data to one or more of the RVS 260 and the HHC controller 280. The received data may include control instructions from the HHC controller 280 and/or the RVS 260. The transmitted data may include status information from the vehicle systems 310, sensor information, and location information, for example. The wireless interface 405 may include one or more antennas and may support a variety of standards, protocols, and frequencies such as Wifi, cellular, Bluetooth, 1.3 Ghz, 2.4 Ghz, 5.8 Ghz, and 900 Mhz. In some implementations, the control signals may be received using a different frequency and/or antennae than is used to send status information.

The processing means 410 may execute software that manages and routes data to and from the various components of the VCS 230. For example, the processing means 410 may receive control instructions from one or more of the ICS interface 406 and/or wireless interface 405 and may pass the control instructions to the vehicle systems 310 via the vehicle interface 407. Similarly, the processing means 410 may provide status data received from the vehicle systems 310 via the vehicle interface 407 to one or more of the wireless interface 405 and the ICS interface 406. When routing data to and from the various components of the VCS 230 the processing means may transform or format the data into whatever formats are expected or supported by the receiving components. The processing means 410 may include a processor and memory.

The processing means 410 may further interface with an e-stop 284. The e-stop 284 may generate a stop signal that is received by the processing means 410. Upon receipt of the stop signal, the processing means may instruct the vehicle systems 310 via the vehicle interface 407 to immediately halt the vehicle. Alternatively, or additionally, the e-stop 284 may generate a heartbeat signal that is received by the processing means 410. In the event that the heartbeat signal ceases (either because the e-stop 284 has been activated or malfunctioned) the processing means 410 may instruct the vehicle systems 310 via the vehicle interface 407 to immediately halt the vehicle.

The processing means 410 may further receive power through the fuse 409, and may distribute the power to the various components of the VCS 230 via a bus. The fuse 409 may receive power from a vehicle power source 420 associated with the vehicle. The power may be received via a 4 pin power connector; however other connectors or connector types may be used. The fuse 409 may limit the amount of power that the VCS 230 may draw from the vehicle at any time thereby preventing the VCS 230 from inhibiting the amount of power that is available to the vehicle. In some implementations, the power from the fuse 409 may be further distributed to the ICS 220 via the ICS 406 interface.

While not shown, the VCS 230 may include additional components or sensors such as an accelerometer, a GPS, or other location determination means. In addition, the VCS 230 may include a battery or other power source that is independent of the vehicle power source 420.

FIG. 5 is an illustration on an example HHC 280. As shown the HHC 280 include one or more components including, but are not limited to a wireless interface 501, sensors 502, battery 504, display 505, user controls 540, an e-stop controller 530, and a processing means 510. More or fewer components may be supported.

The wireless interface 501 may receive and/or transmit data to one or more of the ICS 220 and the VCS 230. As described above, the HHC 280 may be used by an operator to control a vehicle via one or more of the ICS 220 and the VSC 230. The received data may include status information from the vehicle systems 310, location information associated with the vehicle, vehicle sensor data, and peripheral device 210 data, for example. The transmitted data may include control data and other instructions generated by the operator of the HHC 280. The wireless interface 501 may include one or more antennas and may support a variety of standards, protocols, and frequencies such as Wifi, cellular, Bluetooth, 2.4 Ghz, 5.8 Ghz, and 900 Mhz. In some implementations, the control signals may be sent using a different frequency and/or antennae than is used to receive status information or peripheral device 210 data.

The HHC 280 may include user controls 540. The user controls 540 may include a variety of input means such as buttons and joysticks. The input means may be digital, analogue or some combination of both. The input means may be mapped to variety of vehicle systems 310 and controls such as throttle, brakes, and steering. In addition, one or more of the input means may be mapped to one or more peripheral devices 210 such as lights, camera, or weapons systems. The particular mapping of the user controls to the vehicle systems 310 and/or peripheral devices 210 may be customized by an operator or administrator, for example.

The HHC 280 may further include a display 505. The display 505 may be used to display data received by the HHC 280 from the ICS 220 and/or the VSC 230. For example, the VSC 230 may provide the HHC 280 with information about the vehicle such as speed, temperature, and location. The HHC 280 may display the information to an operator on the display 505. Alternatively, or additionally the HHC 280 may receive video data from a peripheral device 210 of the ICS 220 and may display the video data to the operator on the display 505. The display 505 may include a variety of display types including LCD and OLED. Other types of displays may be used.

The HHC 280 may include a variety of sensors 502. The sensors 502 may include a variety of sensor types including a location determination means such as a GPS, an accelerometer, a gyroscope, thermometer, impedance sensor, camera, fingerprint reader and a light sensor. Other types of sensors may be used. The data from the sensors 502 may be used to implement various safety and security related features.

For example, the sensors 502 may be used to determine if an operator is currently holding the HHC 280. For example, a sudden large acceleration detected by an accelerometer may indicate that the HHC 280 has been dropped. Similarly, because operators do not typically stand completely still, there is an expected amount of background movement or acceleration that is associated with being held still by an operator. If no acceleration is detected, or the detected acceleration is otherwise outside of this expected amount, then the user may have either placed the HHC 280 down or may otherwise be impaired. If any of the above conditions are detected, then the HHC 280 may be deactivated, or the HHC 280 may send the ICS 220 or VSC 230 a signal to deactivate the vehicle.

In another example, a gyroscope sensor or magnetometer of the HHC 280 may detect the orientation of the HHC 280 and may deactivate the HHC 280 if the orientation is outside of an acceptable range. For example, if the HHC 280 is in an orientation that implies that the operator is lying down, upside down, or in any other unacceptable operating position, the HHC 280 may be deactivated. The ICS 220 and/or VSC 230 may be similarly also be deactivated as a result of the HHC 280 deactivation. The camera, light sensor, and/or impedance sensor may similarly be used to determine if the HHC 280 is being held by a user.

With respect to security, the camera, fingerprint reader, and impedance sensor, alone or in combination, may be used to authenticate an operator of the HHC 280. If an operator is not an authorized operator, or otherwise cannot be authenticated, the HHC 280 may be disabled along with the associated vehicle.

The processing means 510 may execute software that manages and routes data to and from the various components of the HHC 280, as well as perform any processing related to the display 505, sensors 502, and user controls 540. For example, the processing means 510 may receive indications of one or more button actuations from the user controls 540, may determine corresponding commands and/or instructions. These instructions may be then provide to the wireless interface 501 for transmission to the ICS 220 and/or VSC 230. Similarly, the processing means 510 may receive location or video data from the ICS 220, and may format or process the received data into a format that is suitable for display on the display 505. The processing means 510 may further implement the various safety and authentication features described above.

The processing means 510 may further interface with an e-stop controller 530. The e-stop controller 530 may be mapped to a particular button or switch of the user controls

540, and when actuated may cause a stop signal to be sent to the processing means 510. Upon receipt of the stop signal, the processing means 510 may send a corresponding stop signal or instruction via the wireless interface 510 to an associated e-stop 284 of the controlled vehicle. Depending on the implementation, the e-stop controller 530 may include its own processing means and wireless interface so that the other operations of the HHC 280 do not impede or interfere with the operation of the e-stop controller 530.

Figure 6:
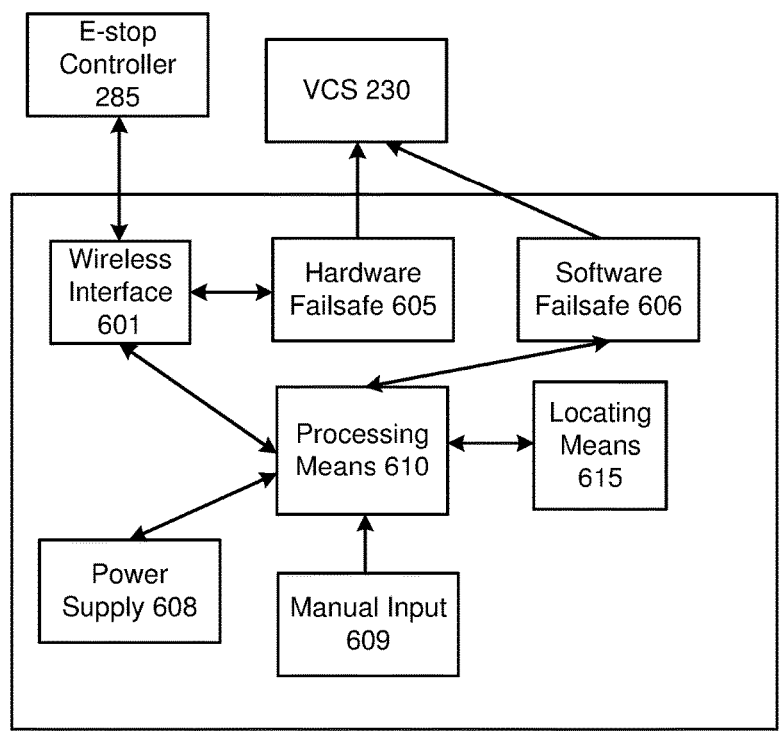
FIG. 6 is an illustration of an example e-stop.

FIG. 6 is an illustration of an example e-stop 284. The e-stop 284 may include a plurality of components including a wireless interface 601, a hardware fail safe 605, a software failsafe 606, a processing means 610, a locating means 615, a power supply 608, and a manual input 609. More or fewer components may be supported. As described above, an e-stop 284 may be paired with a vehicle, manufacturing device, or other machinery, and may allow one or more users to immediately stop the operation of the paired machinery or vehicle by activating either a button or switch attached to the e-stop 284, or through one or more wireless e-stop controllers 285. The e-stop 284 may halt the operation of a vehicle or machinery by sending a stop signal, for example.

The e-stop 284 may include a wireless interface 601. The wireless interface may include at least one antenna or radio and may be used to receive data from an e-stop controller 285. A variety of communication standards, protocols, and frequencies such as Wifi, cellular, Bluetooth, 1.3 Ghz, 2.4 Ghz, 5.8 Ghz, and 900 Mhz may be supported by the wireless interface 601. In some implementations, the e-stop 284 may periodically send a heartbeat signal to the e-stop controller 285 indicating that the e-stop 284 is operating correctly.

To prevent malfunction of the e-stop 284, the e-stop 284 may include a two stage failsafe system. The system may include the hardware failsafe 605 and the software failsafe 606. The hardware failsafe 605 may determine whether there is an active connection with the e-stop controller 285 and the e-stop 284. If at any time the wireless connection between the e-stop controller 285 and the e-stop 284 fails or is interrupted, the hardware failsafe 605 may trigger the stop signal to halt the vehicle or machinery.

The software failsafe 605 may monitor the received signal for one or more of a heartbeat signal and a stop signal from the e-stop controller 285. If the stop signal is received from the software failsafe may trigger the stop signal to halt the vehicle or machinery. The heartbeat signal may signify that the e-stop controller 285 is operating correctly, thus if the heartbeat signal ceases to be received from the e-stop controller 285, the software failsafe 605 may similarly trigger the stop signal to halt the vehicle or machinery.

As may be appreciated, the hardware failsafe 605 may allow the e-stop controller 285 to stop the associated vehicle or machinery even where the software failsafe 606 has failed. For example, the e-stop controller 285 may stop receiving the heartbeat signal from the e-stop 284. Because the heartbeat signal is not being received, there may be a software malfunction of the software failsafe 606 that is preventing the heartbeat signal from being generated. However, because there is a software error, even if the e-stop controller 285 were to send a stop signal to the software failsafe 606, there is a risk that the software failsafe 606 may not respond correctly. Accordingly, rather than, or in addition to sending the stop signal, the e-stop controller 285 may deactivate the wireless connection between the e-stop controller 285 and the e-stop 284. The deactivation of the wireless connection will be detected by the hardware failsafe 605, and may cause the hardware failsafe 605 to trigger the stop signal to halt the vehicle or machinery. Because the hardware failsafe 605 is implemented using hardware, rather than software, the hardware failsafe 605 is not affected by software malfunctions.

The processing means 610 may execute software that manages and routes data to and from the various components of the e-stop 284, as well as perform any processing related to the software failsafe 605.

The locating means 615 may determine a current location of the e-stop 284. The locating means 615 may be implemented using a variety of location determination technologies including GPS. The processing means 610 may use the determined location to perform some additional safety functionality. For example, the e-stop controller 285 may periodically transmit its location to the e-stop 284. The processing means 610 may compare the location of the e-stop controller 285 with the location of the e-stop 284 and may determine if they exceed a minimum separation distance. And if so, the processing means 610 may trigger the stop signal to halt the vehicle or machinery. Alternatively, the e-stop 285 may provide its location to the e-stop controller 285, and the e-stop controller 285 may determine if the maximum distance has been exceeded.

The e-stop 284 may further include the power supply 608. The power supply 608 may be a battery, or may be power received from the associated vehicle or machinery, for example. Any type of battery may be used. In some implementations, the e-stop 284 may trigger the stop signal to halt the vehicle or machinery should the remaining battery fall below a threshold.

The e-stop 284 may further include a manual input 609. The manual input 609 may be a button, switch or other input means. When actuated, the manual input 609 may trigger the stop signal to halt the vehicle or machinery. The manual input may be implemented using hardware to prevent malfunction in the event of a software failure.

Figure 7:
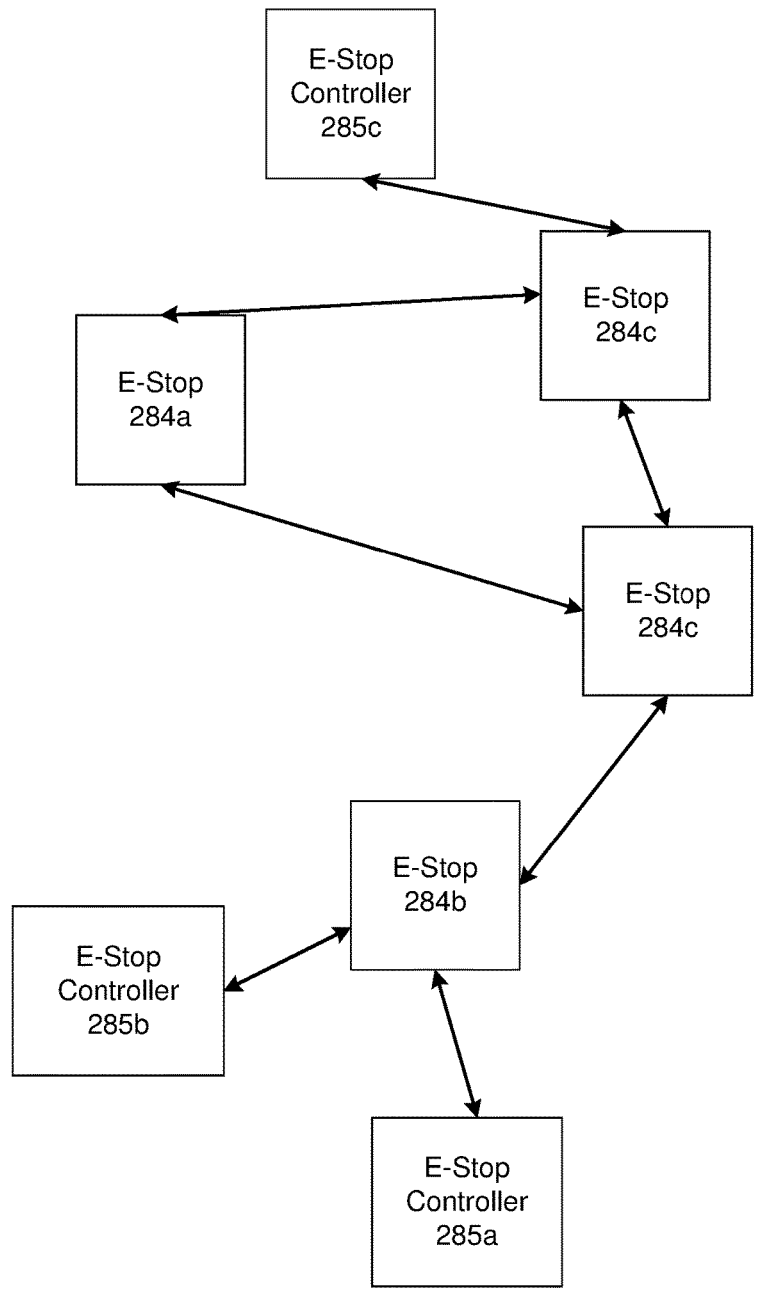
FIG. 7 is an illustration of an example mesh network formed by e-stops and e-stop controllers.

FIG. 7 is an illustration of a system of distributed e-stops 284 and e-stop controllers 285. As shown the system includes a plurality of e-stops 284*a-d* (collectively referred to as e-stops 284) and a plurality of e-stop controllers 285*a-c* (collectively referred to as e-stop controllers 285). While only four e-stops 284 and three e-stops controllers 285 are shown, it is for illustrative purposes only. There is no limit to the number of such devices that may be supported.

As shown, together, the e-stops 284 (and e-stop controllers 285) may form a mesh wireless network. When an e-stop controller 285 desires to send a signal (such as a stop signal) to particular e-stop, the controller 285 may send it to any available e-stop 284, which may then forward the signal to the specified e-stop 285. For example, a user of the e-stop controller 285*c* may wish to stop the machinery associated with the e-stop 284*c*. Depending on the implementation, the user may select the e-stop 284*c* from a list of e-stops 285 on a display associated with the e-stop controller 285*c*, or may actuate an input of the e-stop controller 285*c* that has been mapped to the e-stop 284*c*. After selecting the e-stop 284*c*, the stop signal may be sent to the e-stop 284*d* because that is the closest e-stop 284 to the e-stop controller in the mesh network. The e-stop 284*d* may then forward the signal to the e-stop 284*c*, which may then halt or stop its associated machinery or vehicle. Any system method or technique for mesh networking may be used.

In some implementations, each e-stop controllers 285 may be paired with one or more of the e-stops 284 and may only halt the machinery or vehicle associated with an e-stop 285 that is paired with. Alternatively, one or more of the e-stop controllers 285 may stop any of the e-stops 284 that are available. The e-stop controllers 285 may be manually paired with a particular e-stop 284 by a user or administrator. Alternatively, the e-stop controllers 285 may automatically be paired with the e-stops 284 that they are closest to based on location data associated with the e-stop controllers 285 and the e-stops 284.

In another implementation, a master e-stop controller 285 may be provided. The master e-stop controller 285 may override the stop signal sent by the other e-stop controllers 285, and may therefore restart a halted vehicle or machinery. The master e-stop controller 285 may also be able to stop any available e-stop 284 on the network. The master e-stop controller 285 may automatically pair with a closest available mesh network. For example, a foreman may oversee several factories or construction sites. When the foreman visits a site or floor his or her controller 285 may discover the network of e-stops 284 at the site or floor and may immediately be able to halt any of the machines associated with the e-stops 284

In another implementation, the e-stop controllers 285 may be classified as either primary or secondary e-stop controller 285. Each e-stop 284 may determine, based on location information, if it is within a minimum distance of any secondary e-stop controller 285. If not, the e-stop 284 may halt its associated machinery. Whereas the primary controller 285 may not be subject to such distance requirements.

For example, workers on a factory floor may be each assigned a secondary e-stop controller 285, while a foreman on the floor is assigned a primary e-stop controller 285. Each of the floor workers is tasked with overseeing a particular piece of machinery therefore the e-stops 284 may determine that at least one secondary e-stop controller 285 is within a monitoring distance of the machinery. On the other hand, the foreman may desire to be able to stop the operation of a piece of machinery while on the factory floor, but it is not crucial that he or she always be on the floor or within a particular distance of the e-stops 284.

Figure 8:
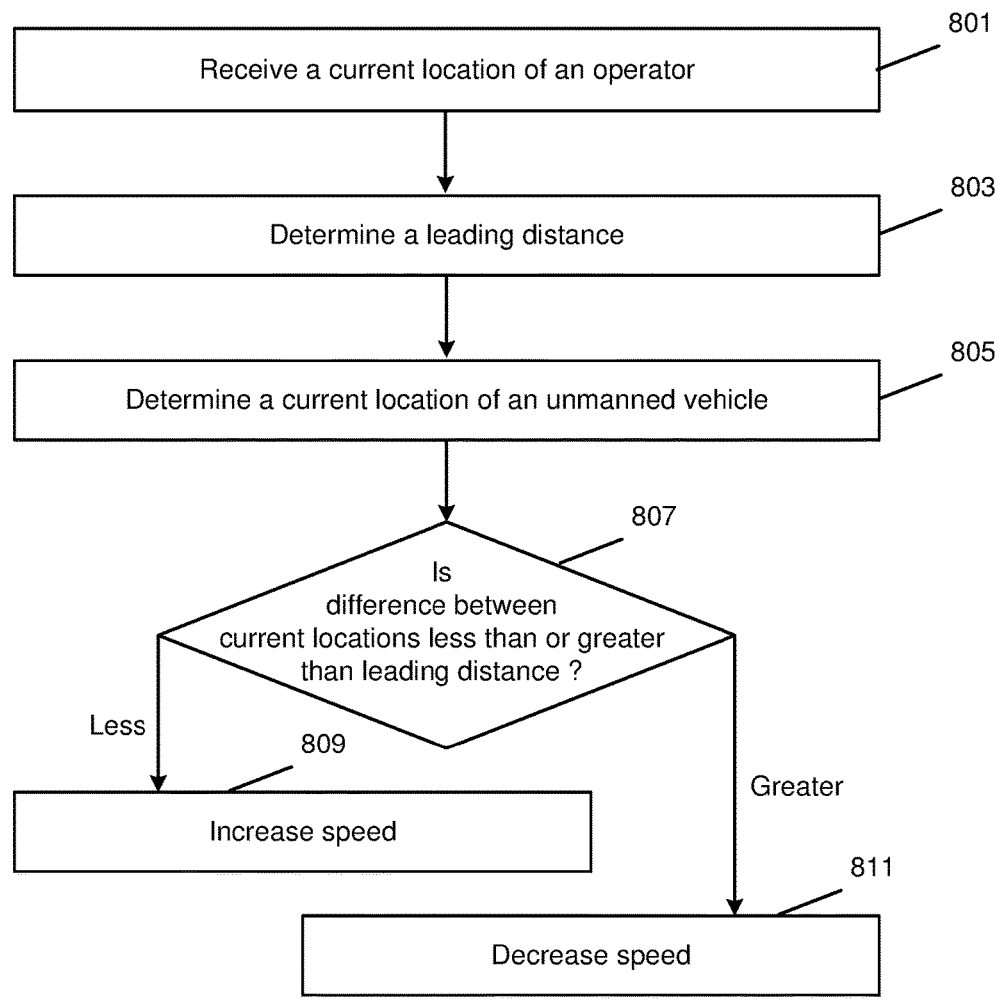
FIG. 8 is an illustration of an example method for increasing or decreasing a speed of a vehicle based on a leading distance.

FIG. 8 is an illustration of a method 800 implementing semi-autonomous navigation of an unmanned vehicle using the OIP 100. The method 800 may automatically control the throttle of the unmanned vehicle allowing the user to focus on steering the unmanned vehicle or on operating one or more peripheral devices 210. Because the user is not controlling the throttle, the functionality of the HHC 280 may be integrated into binoculars, or into a weapon such as rifle. For example, such an HHC 280 may be incorporated into a weapon using a single joystick allowing the user to have their weapon engaged while still controlling the unmanned vehicle. A screen may be provided on the weapon to display received video data from the ICS 220 associated with the vehicle to further assist the user in the control of the vehicle or to identify upcoming threats. The method 800 may be implemented by the ICS 220 and VSC 230 associated with a unmanned vehicle in conjunction with either the HHC 280 or the RVS 260.

At 801 a current location of an operator may be determined. The operator may be operating the HHC 280 and the current location may be determined by a GPS or other locating means associated with the HHC 280. The operator of the HHC 280 may be following the vehicle that is being controlled by the HHC 280. For example, the operator may be in a different vehicle, or may be walking.

At 803 a leading distance between the operator and the unmanned vehicle may be determined. The leading distance may be the desired distance that may be maintained between the unmanned vehicle and the operator. The leading distance may be randomly determined or selected (to confuse possible threats), or may be a fixed distance.

At 805 a current location of the vehicle is determined. The current location may be determined by the locating means associated with either the ICS 220 or the VSC 230.

At 807 a determination is made as to whether the distance between the current location of the operator and the unmanned vehicle is less than or greater than the leading distance. If the difference is less than the leading distance, then the VCS 230 or the ICS 220 may increase the speed of the vehicle at 807. If the difference is greater than the leading distance, then the VCS 230 or the ICS 220 may decrease the speed of the vehicle at 809.

The inherent flexibility of the OIP 100 means that the possibilities for applications are quite numerous. Its ability to be adapted to control many vehicles of varying sizes and different operational environments enables the use of a single platform to develop a wide variety of solutions without needing to support a multitude of systems with redundant development efforts. Examples of such applications follow.

Windowing System

The SCM 240 may provide a unique windowed approach to share control of a vehicle between an operator and an autonomous sensor based algorithm. A window may be a period of time that the HHC 280 is permitted to control the vehicle, and may define a set of allowable controls for the HHC 280 and/or upper or lower bounds on the controls. Outside of the window, the SCM 240 may autonomously control the vehicle. While the operator is using the HHC 280 to drive the vehicle, the SCM 240 may use sensor data and autonomy algorithms to define windows of allowable control commands to the VSC 230. For example, the operator may instruct the vehicle to drive at a high speed using the HHC 280, while the autonomy algorithm has determined that danger lies ahead. In response to the danger determination, the SCM 240 may create a window that provides an upper limit for the speed of the vehicle to the VSC 230 to ensure that speed is reduced and a safe speed is used. The VSC 230 may use the defined windows from the SCM 240 to manipulate the vehicle commands from the HHC 280 before ultimately driving the vehicle. If the danger still lies ahead, the SCM 240 may bring the vehicle to a stop or slowly start to steer the vehicle in a safe direction. If the SCM 240 determines that full autonomy is needed to complete a task, it may reduce the allowable window to a single point, thus taking the HHC out of the loop completely.

Safe Takeover

Another example is known as safe takeover. As described above, the OIP 100 allows for a variety unmanned vehicles to be operated remotely by a user through the HHC 280, even in situations where the user may not have a clear line-of-sight of the unmanned vehicle. Accordingly, a user or administrator may use the OIP 100 to enforce a safety procedure that may be used to verify that the vehicle may be safely operated by the HHC 280 before the OIP 100 allows the HHC 280 to control the vehicle (i.e., takeover).

In one implementation, the OIP 100 may force the user to actuate one or buttons or switches on the vehicle before the VSC 230 or ICS 220 will allow the HHC 280 to control the vehicle. The buttons or switches may be located at different locations on the vehicle to ensure that the user has verified that no lives or property will be damaged by the vehicle. The same takeover sequence may be used for each takeover, or may be randomized. The takeover sequence may be displayed to the user on the display of the HHC 280. Such a safety procedure may be useful on a construction site or other work environment. The takeover sequence may be customizable by a user or administrator, or may be disabled depending on the implementation.

Training Applications

In some implementations, multiple HHCs 280 may be used to provide training for HHC 280 operators. For example, one HHC 280 may be the "Instructor" controller and another HHC 280 may be a "trainee" controller. The VSC 230 or ICS 220 may receive commands from either the instructor or the trainee controller, but when instructions are received from both controllers, or if there is a conflict between instructions that are received from the controllers, the instructions that are received from the instructor controller are followed.

In another implementation, an instructor may view a video feed from an unmanned vehicle on a personal device through the RVS 260. The unmanned vehicle may be controlled by a trainee using the HHC 280. The instructor may use the personal device to provide instructions/and or critiques to the trainee that may be displayed to the trainee on the display of the HHC 280 or on a video feed that the trainee is otherwise viewing. The instructor may use the personal device to disable the unmanned vehicle or to otherwise take control of the vehicle away from the trainee if necessary.

Safety Applications

In another implementation, the ICS 220 may enforce a minimum distance between an unmanned vehicle and other users to ensure the safety of the users. For example, the ICS 220 may determine the distance between the unmanned vehicle and the HHC 280 (via GPS), and may disable the unmanned vehicle if the distance is less than a threshold distance. In another example, workers who operate close to unmanned vehicles may wear wireless sensors. If the ICS 220 determines that such a wireless sensor is within the threshold distance, the ICS 220 may disable the vehicle until the worker with the wireless sensor moves outside of the threshold distance.

Instrument-Aided Precise Manipulation

Integrating high-precision distance sensors into the ICS 220 allows the control of tools with extreme accuracy, even with significant standoff distances. Positioning a sensor on the manipulator arm of a robot gives the operator precise distance feedback between the arm and the object of interest. This simple feedback provides a sense of depth not available on a simple video screen, increasing the precision achievable while also reducing the cognitive workload on the operator.

Figure 9:
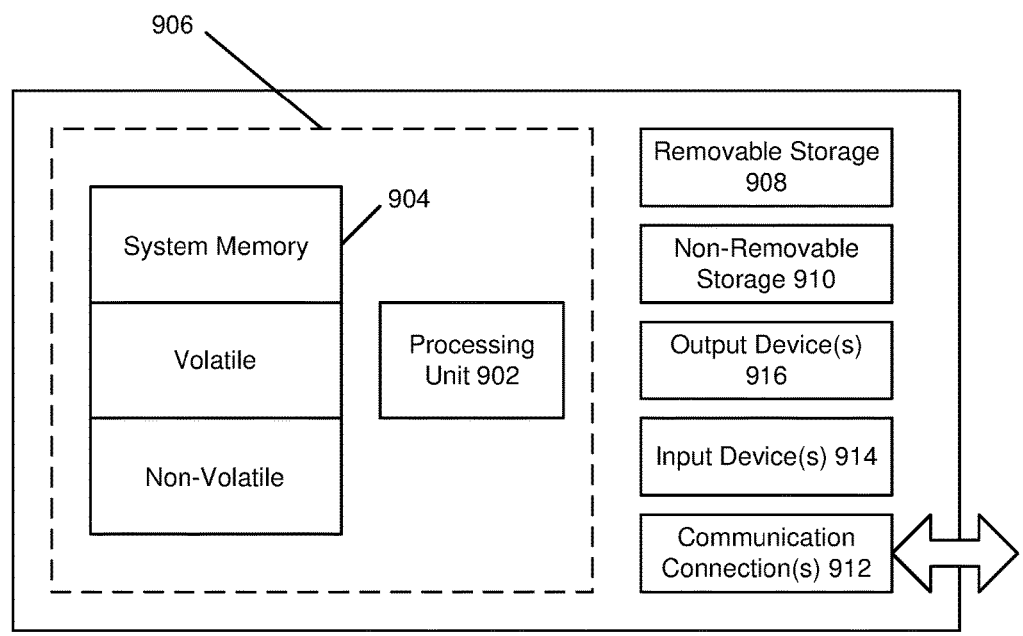
FIG. 9 is an illustration of an example computing environment where aspects of the invention may be implemented.

FIG. 9 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing aspects described herein includes a computing device, such as computing system 900. In its most basic configuration, computing system 900 typically includes at least one processing unit 902 and memory 904. Depending on the exact configuration and type of computing device, memory 1404 may be volatile (such as random access memory (RAM)), non-volatile (such as read-only memory (ROM), flash memory, etc.), or some combination of the two. This most basic configuration is illustrated in FIG. 9 by dashed line 906.

Computing system 900 may have additional features/functionality. For example, computing system 900 may include additional storage (removable and/or non-removable) including, but not limited to, magnetic or optical disks or tape. Such additional storage is illustrated in FIG. 9 by removable storage 908 and non-removable storage 910.

Computing system 900 typically includes a variety of computer readable media. Computer readable media can be any available media that can be accessed by computing system 1400 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 904, removable storage 908, and non-removable storage 910 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 900. Any such computer storage media may be part of computing system 900.

Computing system 900 may contain communications connection(s) 912 that allow the device to communicate with other devices and/or interfaces. Computing system 900 may also have input device(s) 914 such as a keyboard (software or hardware), mouse, pen, voice input interface, touch interface, etc. Output device(s) 916 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   at least one e-stop controller; and
   at least one e-stop comprising:
      a first failsafe; and
      a second failsafe, wherein the first failsafe is adapted to:
         monitor a connection between the e-stop controller and the e-stop;
         determine if the connection has been severed; and
         if so, halt machinery associated with the e-stop; and
      wherein the second failsafe is adapted to:
         receive a first signal from the e-stop controller; and
         determine whether to halt the machinery associated with the e-stop based on the received first signal.

2. The system of claim 1, wherein the first signal is a heartbeat signal, and the second failsafe determines not to halt the machinery associated with the e-stop based on the heartbeat signal.

3. The system of claim 1, wherein the first signal is a stop signal, and the second failsafe determines to halt the machinery associated with the e-stop based on the stop signal.

4. The system of claim 1, wherein the e-stop controller is further adapted to:
   determine to halt the machinery associated with the e-stop; and
   in response to the determination, turn-off the connection between the e-stop and the e-stop controller.

5. The system of claim 4, wherein determining to halt the machinery associated with the e-stop comprises determining that a second signal has not been received from the e-stop by the e-stop controller for more than a threshold amount of time.

6. The system of claim 5, wherein the second signal is a heartbeat signal.

7. The system of claim 1, wherein the first signal is a location of the e-stop controller, and determining whether to halt the machinery associated with the e-stop comprises determining whether a distance between the location of the e-stop controller and a location of the e-stop exceeds a minimum distance.

8. The system of claim 1, wherein the first failsafe is a software failsafe and the second failsafe is a software failsafe.

9. The system of claim 1, wherein the connection is a wireless radio connection.

10. A system comprising:
    at least one e-stop controller; and
    at least one e-stop comprising:
       a first failsafe; and
       a second failsafe, wherein the first failsafe is adapted to:
          monitor a connection between the e-stop controller and the e-stop;
          determine if the connection has been severed; and
          if so, halt machinery associated with the e-stop; and
       wherein the second failsafe is adapted to:
          receive a location of the e-stop controller from the e-stop controller; and
          determine whether to halt the machinery associated with the e-stop based on the received location.

11. The system of claim 10, wherein the e-stop controller is further adapted to:
    determine to halt the machinery associated with the e-stop; and
    in response to the determination, turn-off the connection between the e-stop and the e-stop controller.

12. The system of claim 11, wherein determining to halt the machinery associated with the e-stop comprises determining that a heartbeat has not been received from the e-stop by the e-stop controller for more than a threshold amount of time.

13. The system of claim 10, wherein the first failsafe is a software failsafe and the second failsafe is a software failsafe.

14. The system of claim 10, wherein the connection is a wireless radio connection.

15. An e-stop comprising:
    a first failsafe; and
    a second failsafe, wherein the first failsafe is adapted to:
       monitor a connection between an e-stop controller and the e-stop;
       determine if the connection has been severed; and
       if so, halt machinery associated with the e-stop; and
    wherein the second failsafe is adapted to:
       receive a first signal from the e-stop controller; and
       determine whether to halt the machinery associated with the e-stop based on the received first signal.

16. The e-stop of claim 15, wherein the first signal is a heartbeat signal, and the second failsafe determines not to halt the machinery associated with the e-stop based on the heartbeat signal.

17. The e-stop of claim 15, wherein the first signal is a stop signal, and the second failsafe determines to halt the machinery associated with the e-stop based on the stop signal.

18. The e-stop of claim 15, wherein the first signal is a location of the e-stop controller, and determining whether to halt the machinery associated with the e-stop comprises determining whether a distance between the location of the e-stop controller and a location of the e-stop exceeds a minimum distance.

19. The e-stop of claim 15, wherein the first failsafe is a software failsafe and the second failsafe is a software failsafe.

20. The e-stop of claim 15, wherein the connection is a wireless radio connection.

* * * * *